May 5, 1959  S. H. HARGIS  2,885,014
FURROW OPENER
Filed Oct. 7, 1955

Sam H. Hargis
INVENTOR.

United States Patent Office 2,885,014
Patented May 5, 1959

2,885,014
FURROW OPENER
Sam H. Hargis, Murray, Ky.
Application October 7, 1955, Serial No. 539,092
2 Claims. (Cl. 172—719)

The present invention relates generally to seed planters or drills and has for its primary object to provide, in a manner as hereinafter set forth, a furrow opened which is adapted to be expeditiously mounted for operation on the usual drill swords or runners of such implements.

Another very important object of the invention is to provide a furrow opener of the aforementioned character comprising novel means for adjustably securing the device in position on the drill sword.

Other objects of the invention are to provide a furrow opener of the character described which will be comparatively simple in construction, strong, durable, highly efficient and reliable in use, compact and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
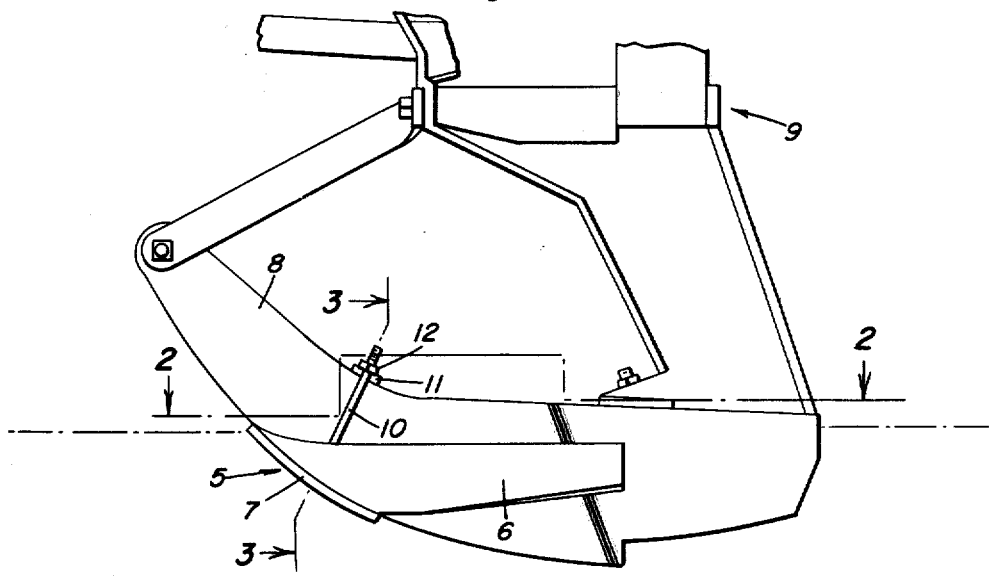
Figure 1 is a view in side elevation, showing a furrow opener constructed in accordance with the present invention installed for use.
Figure 2:
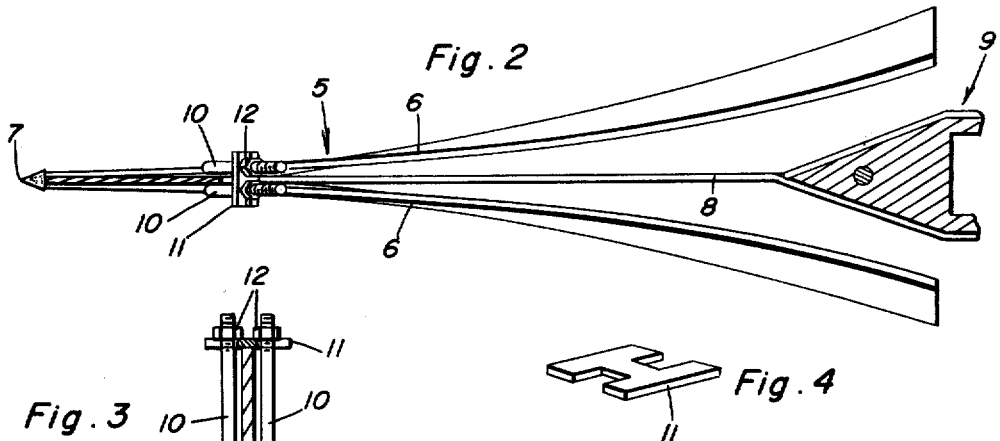
Figure 2 is a view in horizontal section, taken substantially on the line 2—2 of Figure 1.
Figure 3:
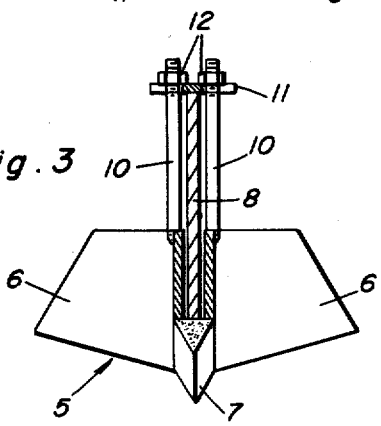
Figure 3 is a cross-sectional view, taken substantially on the line 3—3 of Figure 1.
Figure 4:
Figure 4 is a detail view in perspective of one of the fastening elements.

Referring now to the drawing in detail, it will be seen that the embodiment of the invention which has been illustrated comprises a substantially V-shaped tool of suitable metal which is designated generally by reference character 5. The tool 5 includes a pair of longitudinally curved, rearwardly divergent and spirally twisted blades or wings 6 of substantially the shape shown to advantage in Figure 1 of the drawing. The forward end or bight portion of the tool 5 is formed to provide an arcuate cutting edge or blade 7 of substantially triangular cross-section.

The tool 5 is adapted to be removably and adjustably mounted astraddle a conventional drill sword or runner 8 of a planter 9. Toward this end, the wings 6 have affixed to the forward portions thereof a pair of upwardly and rearwardly inclined shanks or studs 10. A substantially H-shaped clamping plate 11 of suitable metal is mounted on the shanks 10 and engaged with the upper edge of the sword or runner 8. Nuts 12 are threaded on the upper end portions of the shanks 10 and engaged with the plate 11 for securing the tool 5 in position on the sword 8.

It is thought that the operation of the device will be readily apparent from a consideration of the foregoing. Briefly, as the sword 8 moves through the ground in the usual manner, the wings 6 of the tool 5 spread the soil in opposite directions and open a furrow. The spiral twist of the blades or wings 6 forces the tool 5 downwardly. The arcuate blade 7 on the forward end of the tool 5 readily penetrates hard soil and cuts through or rides over obstructions. By simply loosening the nuts 12, the tool 5 may be readily adjusted forwardly or rearwardly as desired on the sword 8. As the opener is adjusted forwardly greater depth of planting is acquired while rearward adjustment of said opener decreases the planting depth. Also, the same depth of planting is maintained with any one adjustment, since this is determined by the portion of the sword that extends below the tool. It will thus be seen that unlevel ground will not affect the planting depth since this is stable at any one setting of the tool.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use on and complemental to a conventional-type drill sword having an upturned leading end with a curvilineal edge; a furrow opening attachment for said drill sword comprising an arcuately curved earth cleaving blade triangular in cross-section, the rearward lengthwise surface of said blade being of a radius conformable with the radius of said curvilineal edge, a pair of simultaneously functioning duplicate wings elongated lengthwise and adapted to straddle an intervening portion of said drill sword, the bottom edges of said wings being generally coplanar and designed to operate in a plane spaced well above the bottom edge of the sword, the leading end portions of said wings converging and joining the rear face of the blade and the exterior surfaces of the converging end portions being a distance apart approximately the same as the cross-section of said blade, said wings being bowed longitudinally and the rearward ends being poised in divergent relationship, the lower half-portions of the median and rear areas of said lengthwise wings also being spirally twisted and flaring in directions away from the drill sword and providing a desired moldboard effect, whereby to assist resisting any tendency of the blade to ride up and out of the furrow, and means carried by said wings whereby the same may be removably and adjustably bolted on the drill sword.

2. The structure defined in claim 1 and wherein said means comprises a substantially H-shaped plate which is adapted to be mounted atop the rearward edge of the drill sword adjacent said blade, shanks joined with the upper forward edge portions of the respective wings, said shanks being rigid and having upper screw-threaded ends, said screw-threaded ends being removably seated in the existing notches in the H-shaped plate, said upper threaded ends being adapted to accommodate assembling and clamping nuts, said wings being capable of being spread apart, permitting the shanks to ride out of the notches to allow the H-shaped plate to be loosened or completely removed without removing the nuts.

References Cited in the file of this patent
UNITED STATES PATENTS

| | | |
|---|---|---|
| 770,878 | Vivian | Sept. 27, 1904 |
| 988,284 | Perkins | Mar. 28, 1911 |
| 1,072,632 | Milburn | Sept. 9, 1913 |
| 1,258,789 | Krotz | Mar. 12, 1918 |